United States Patent [19]
Powell

[11] Patent Number: 5,344,159
[45] Date of Patent: Sep. 6, 1994

[54] MULTIPLE PANEL CLOSURE FOR OPEN TOP OF BED OF PICKUP TRUCK

[76] Inventor: David L. Powell, 1221 Fairview, Angels Camp, Calif. 95222

[21] Appl. No.: 58,811

[22] Filed: May 4, 1993

Related U.S. Application Data

[63] Continuation of Ser. No. 790,862, Nov. 12, 1991, abandoned.

[51] Int. Cl.⁵ .............................................. B60P 7/02
[52] U.S. Cl. ........................................ 296/100; 160/213
[58] Field of Search .......................... 296/100; 160/213

[56] References Cited

U.S. PATENT DOCUMENTS

| | | | |
|---|---|---|---|
| 2,955,874 | 10/1960 | Brindley | 296/40 X |
| 2,997,330 | 8/1961 | Boultinghouse | 296/100 X |
| 3,069,199 | 12/1962 | Reardon | 296/100 |
| 3,450,431 | 6/1969 | Tyler | 296/100 |
| 3,768,858 | 10/1973 | Boismier | 296/100 |
| 3,858,744 | 1/1975 | Garvert | 296/100 X |
| 3,866,972 | 2/1975 | Reese | 296/100 |
| 4,284,303 | 8/1981 | Hather | 296/100 |
| 4,313,636 | 2/1982 | Deeds | 296/100 |
| 4,418,954 | 12/1983 | Buckley | 296/100 |
| 4,522,440 | 6/1985 | Gostomski | 296/100 |
| 4,550,945 | 11/1985 | Englehardt | 296/100 |
| 4,585,264 | 4/1986 | Miller | 296/3 |
| 4,615,557 | 10/1986 | Robinson | 296/100 |
| 4,695,087 | 9/1987 | Hollrock | 296/100 X |
| 5,009,457 | 4/1991 | Hall | 296/3 |
| 5,011,214 | 4/1991 | Friesen | 296/100 |
| 5,110,021 | 5/1992 | Dawson | 296/100 X |
| 5,183,309 | 2/1993 | Jordan | 296/100 |

*Primary Examiner*—Dennis H. Pedder
*Attorney, Agent, or Firm*—Townsend and Townsend Khourie and Crew

[57] ABSTRACT

A multiple panel closure for the bed of a pickup truck or for the front opening of a cabinet housing electrical equipment. The closure permits any one of four panels to be opened independently of the other panels and the panels can be moved to side positions in which the truck bed and the cabinet opening, respectively, can be exposed. A double hinge provides for the movement of closure panels from closed, coplanar positions to fully open, side positions. Access to the interior of the truck bed or cabinet can be had from the sides of the truck bed and at the sides of the front opening of the cabinet.

23 Claims, 8 Drawing Sheets

MULTIPLE PANEL CLOSURE FOR OPEN TOP OF BED OF PICKUP TRUCK

This is a continuation Ser. No. 07/790,862, filed Nov. 12, 1991, now abandoned.

This invention relates to improvements in closures for opening of various types and, more particularly, to a closure for the open top of the bed of a pickup truck or the front opening of a cabinet for containing electrical equipment.

BACKGROUND OF THE INVENTION

Closure or cover apparatus of multiple panels of various types have been proposed and used for the open top of the bed of a pickup truck. Disclosures relating to this general subject matter are found in the following U.S. Pat. Nos. 2,997,330, 3,069,199, 3,858,744, 4,284,303, 4,313,636, 4,418,954, 4,550,945, 4,615,557, 4,695,087, 5,009,457, and 5,011,214.

For the most part, the mounting of panels on the closures of these patents are quite complex in construction and have had limited use as to the way in which the panels can be selectively opened and closed. Moreover, the closures of conventional designs are generally not waterproof, and rain water can penetrate the closures. Thus, goods carried in the truck bed while the closure is in place can often be damaged.

Because of these limitations of conventional multiple panel closures for the open tops of the beds of pickup trucks, a continuing need exists for improvements in such closures. The present invention provides a solution to the complexity problem.

In the use of access doors for electrical equipment cabinets or housings, a relatively large housing requires that the door be generally a single, relatively massive panel. This requires a large amount of space to open the door since the cabinet itself is quite large to be able to house a great amount of electrical equipment therewithin.

Cabinet doors of electrical equipment swing on vertical doors are typically of one-piece construction. As a result, the doors are relatively large and difficult to open and close. A need, therefore, continues to exist for closures for large openings of cabinets for electrical equipment to simplify the way in which the interiors of such cabinets are accessed. The present invention satisfies this need as well.

SUMMARY OF THE INVENTION

The present invention is directed to an improved multiple panel closure which can be used for covering the open top of the bed of a pickup truck. The closure can also be used as an access door for the front opening of a cabinet for housing electrical equipment. In either case, the closure of the present invention permits any one of four panels to be opened independently of the other panels or the panels can be moved to side positions in which the entire top opening or front opening of the pickup truck and the cabinet, respectively, can be exposed.

The advantages of the present invention when used with the pickup truck include the providing of a low profile when the panels are in their side board positions. The pickup truck also has folding brackets and subframes to provide superior outward strength. Also, there is a unique double hinge which provides for the movement of closure panels from closed, coplanar positions to fully open, side positions.

The structure of the closure of the pickup truck provides a number of panels to be moved into positions in which heavy materials, such as lumber, can be carried on racks or removable crosspieces when the panels are in the side board positions. Moreover, provision is made for providing flexibility for hauling items larger than the height, length and width of the closure in the closed position.

Theft resistance of the closure is superior because subframe hinge pins for mounting the panels can be locked under the closure. The center panels are locked by way of a cam lock or hasp which also locks the tail gate. Access to the interior of the truck bed can be had from the sides of the bed and at the rear of the bed when the tailgate is in a down position. A further important feature is the fact that the center pair of panels of the closure of the present invention can be opened and access can still be maintained as the two side openings remain closed by the outer side panels.

In the housing for electrical equipment, the panel cover of the present invention allows quick, convenient access to operate the equipment in the cabinet. When the doors or closure panels are fully open, such as for wire pulling and/or testing, they block approximately 50% less access space to other certain electrical components in the housing, especially when other components are located across from one another which is common in the electrical equipment industry. The closure of the present invention also maintains strength and rainproof integrity and, with the addition of gaskets in appropriate areas, the system may be constructed dust tight. This would allow design engineers to make more efficient use of the interior space of the cabinet.

The primary object of the present invention is to provide an improved closure for a framed unit, such as the top opening of a bed of a pickup truck or the front opening of a cabinet housing for electrical equipment wherein multiple panels of the closure can be selectively opened or closed yet the panels themselves can be moved into standby side positions to achieve full or partial open conditions for the opening.

Other objects of this invention will become apparent as the following specification progresses, reference being had to the accompanying drawings for an illustration of the invention.

3

DETAILED DESCRIPTION OF THE DRAWINGS

Figure 1:
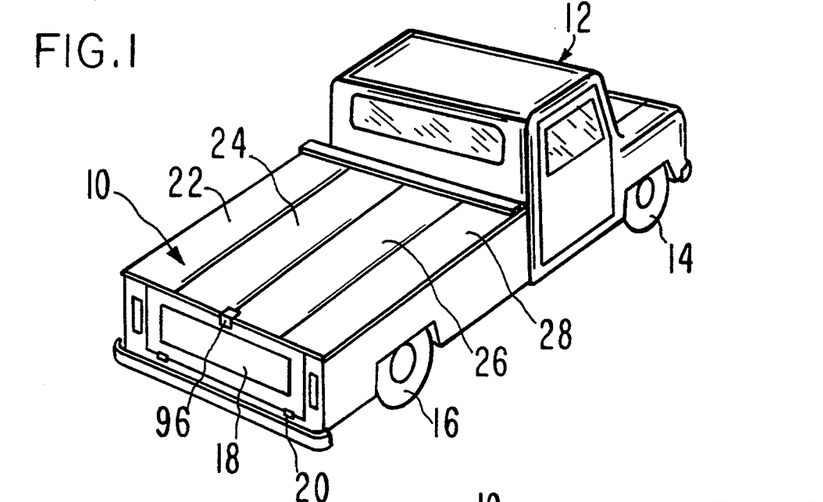
FIG. 1 is a perspective view of a pickup truck having four panels thereon for closing the top opening of the bed of the truck, the panels extending fore and aft and being generally parallel with each other.

The preferred embodiment of the closure assembly of the present invention is broadly denoted by the 10 and is adapted for use on a fixed structure or a moving structure. For purposes of illustration, assembly 10 is shown in FIGS. 1–8 as being applicable for closing the open top of the bed of a pickup truck 12 having front wheels 14, rear wheels 16 and a swingable tailgate 18 hinged for rotation about a horizontal axis 20 so that the tailgate can drop from a closed position as shown in FIG. 1 to an open position.

Figure 2:
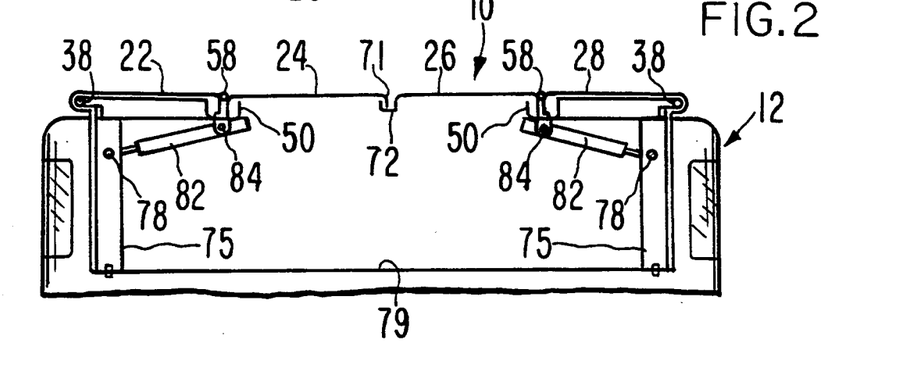
FIG. 2 is a schematic, rear elevational view of the pickup truck, showing the four panels in their closed positions and further showing a pair of braces at the rear of the pickup truck for supporting the panels in their open position.
Figure 3:
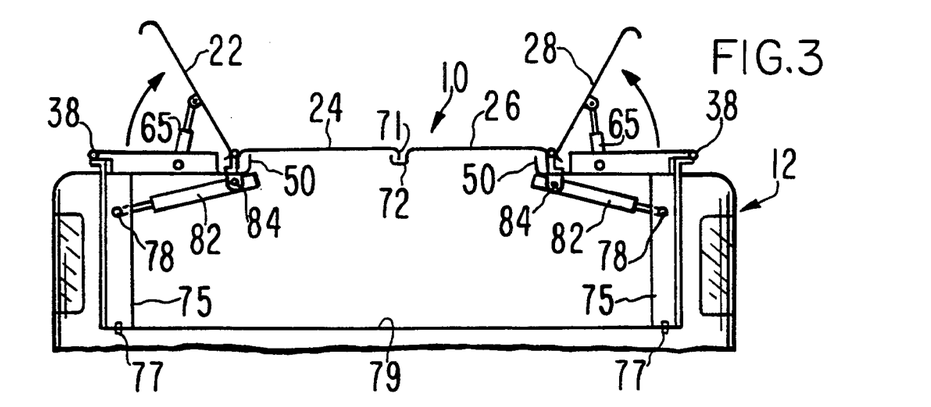
FIG. 3 is a view similar to FIG. 2 but showing the outer two panels in their open, vertical positions.
Figure 6:
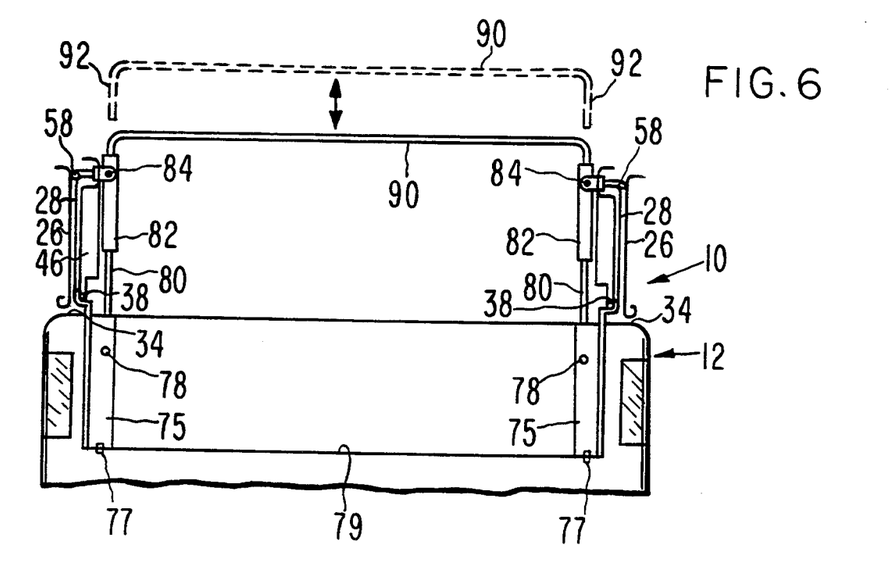
FIG. 6 is a view similar to FIGS. 2 and 3 but showing all four panels raised to full, vertical sideboard positions and with a cross bar in place.
Figure 6A:
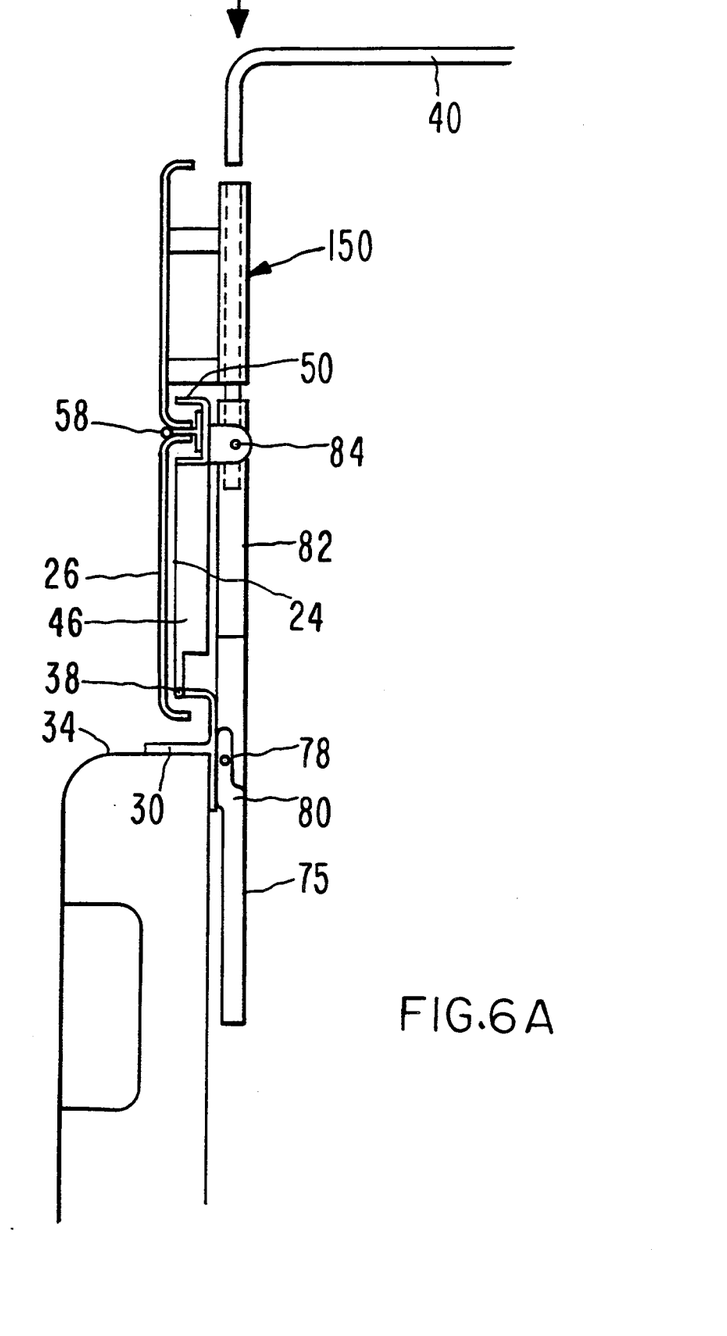
FIG. 6A is a view similar to FIG. 6 but showing an increase in the sideboard height with the addition of sliding brackets.

Closure 10 has a set of four panels denoted by the numerals 22, 24, 26 and 28. The panels are parallel with each other and extend fore and aft of the truck bed as shown in FIG. 1. The closure assembly 10 has hinge means (hereinafter described) which allows the panels 22, 24, 26 and 28 to pivot relative to the bed and relative to adjacent panels so as to selectively open the bed by opening one or more panels without having to open all of the panels. For instance, outer panels 22 and 28 can be pivoted into upright positions, as shown in FIG. 3, from the horizontal, closed positions shown in FIG. 2. Moreover, outer panel 22 can be pivoted into its vertical position while panel 28 remains in or is pivoted out of its horizontal position as shown in FIG. 2. Similarly, inner panels 24 and 26 can individually be opened while the outer panels 22 and 28 remain closed or horizontal. FIG. 6 shows that panels 22, 24, 26 and 28 can be pivoted from the closed positions of FIG. 1 to open, side board positions of FIG. 6. In this view, a cross bar 90 can be provided at each of several locations on the bed for hauling lumber on the cross bars, if desired.

Figures 4, 5:
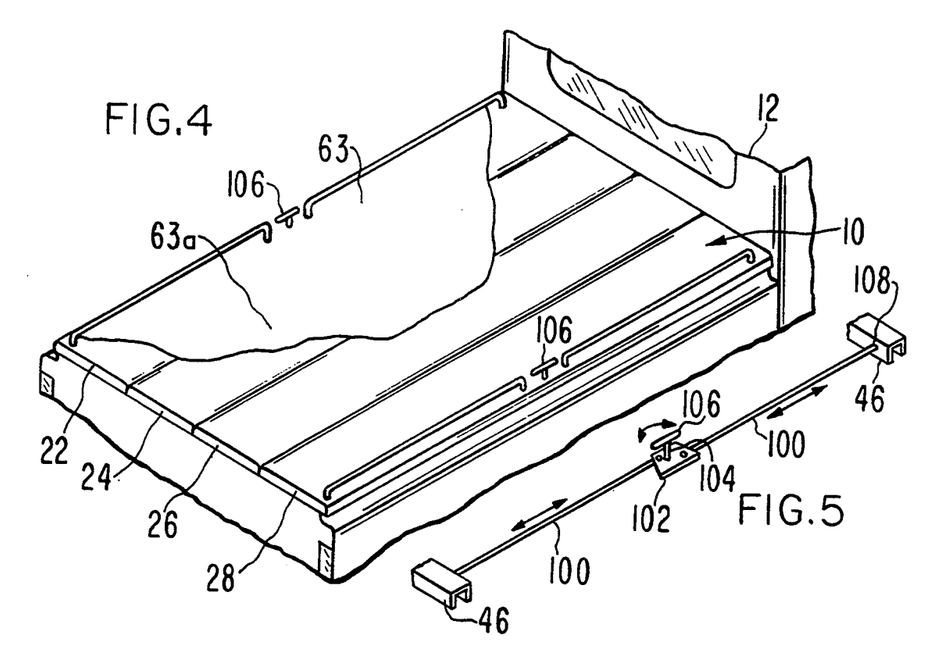
FIG. 4 is an enlarged, fragmentary, perspective view of the bed of the pickup truck showing the rain gutters for the closure panels and a three point latch for releasably holding the panels in closed positions.
FIG. 5 is a fragmentary, schematic view of the three point latch system used with the panels of FIG. 4.
Figure 8:
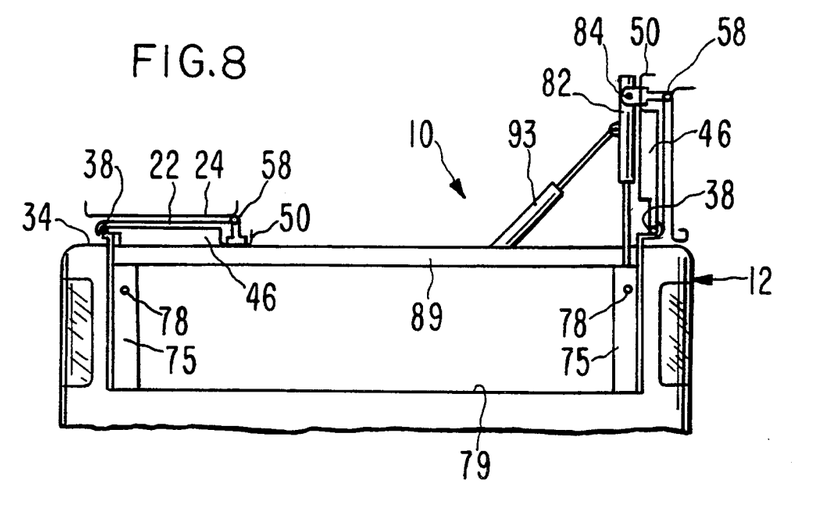
FIG. 8 is a view similar to FIG. 6 but showing the right-hand pair of panels in a side board position and a brace at the front end of the bed of the pickup truck.
Figure 8A:
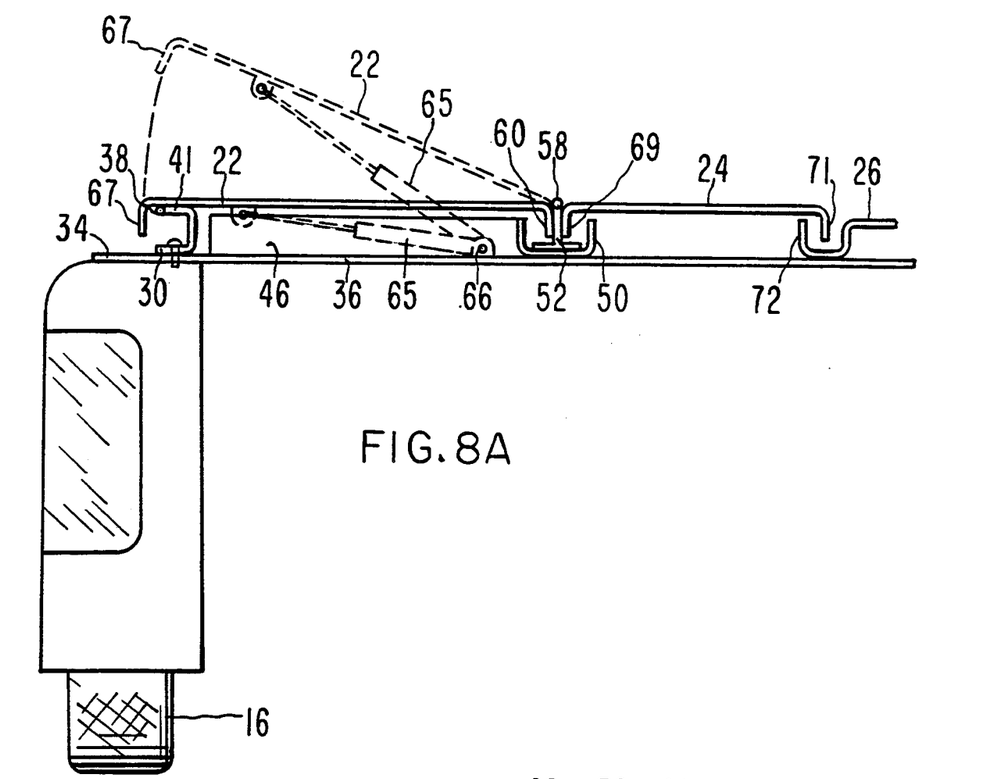
FIG. 8A is a schematic rear elevational view of the left-hand closure panels with the outer panel being partially raised and in dashed lines.
Figure 8B:
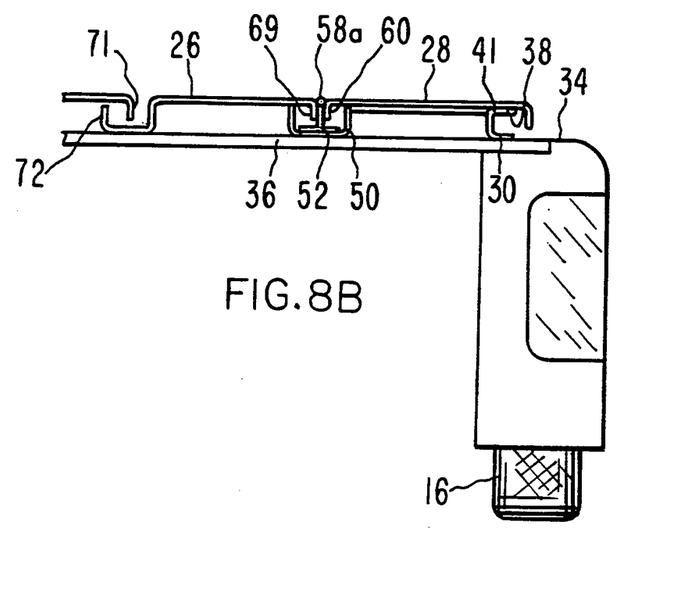
FIG. 8B is a view similar to FIG. 8A but showing the right-hand closure panels.

All of the foregoing positions of panels 22, 24, 26 and 28 are achieved by virtue of pivot hardware of the type shown in FIGS. 8A and 8B and with reference to FIG. 4. Hinging of the panels 22, 24, 26 and 28 occurs as follows: panel 22 pivots about left-hand hinge pin 58 (FIG. 8A); panel 24 pivots about left-hand hinge pin 58 (FIG. 8A); panel 26 pivots about right-hand hinge pin 58a. (FIG. 8B); and panel 28 pivots about hinge pin 58a. Panels 22 and 24 pivot as a unit about left-hand hinge pin 58 (FIG. 8A) when they are moved together into their side board positions shown in FIG. 6. Similarly, panels 26 and 28 pivot as a unit about right-hand hinge pin 38 (FIG. 8B) when they are moved together into their side board positions of FIG. 6.

Panels 22, 24, 26 and 28 are coupled together to form closure assembly 10 in the following manner: a pair of C-shaped members 30 is provided for the left and right side margins of the truck bed, respectively, each C-shaped member 30 being shown in FIGS. 8A and 8B. One flange 32 (FIG. 9) of each member 30 is secured by fasteners, such as machine screws or the like, to the upper surface 34 (FIGS. 8A, 8B and 9) of a rigid bar or strap 36 which extends across each of the front and back portions, respectively, of the truck bed as shown in FIGS. 8A and 8B, the front strap 36 not being shown. Strap 36 can be a crosspiece 90 (FIG. 6) used to haul lumber on the truck bed.

While fasteners, such as machine screws, have been described herein to secure members 30 to the truck, a frame that bolts together could be provided in place of member 30. Such frame will be attached primarily by set screw clamps to the upper lip 34 of the truck. The only bolts that require drilling holes in the truck are fasteners 77 (FIG. 3).

Hinge pin 38 is carried at one end thereof on another flange 41 of each C-shaped member 30 as shown in FIG. 8B. The hinge pin 38 passes through the sleeve 42 (FIG. 9) of a hinge plate 44 coupled by a transversely U-shaped subframe member 46 which extends laterally from the hinge pin 38 and is integral with one side 48 of a transversely U-shaped channel member 50 having a rigid, L-shaped hinge support element 52 rigidly secured to a bottom web 54 of element 50.

Member 50 extends fore and aft between the bars 36 at the front and rear ends of the bed of the vehicle. Moreover, members 30 extend from the rear end of the bed of the pickup vehicle to the front end thereof as shown in FIG. 4.

Figures 9, 10:
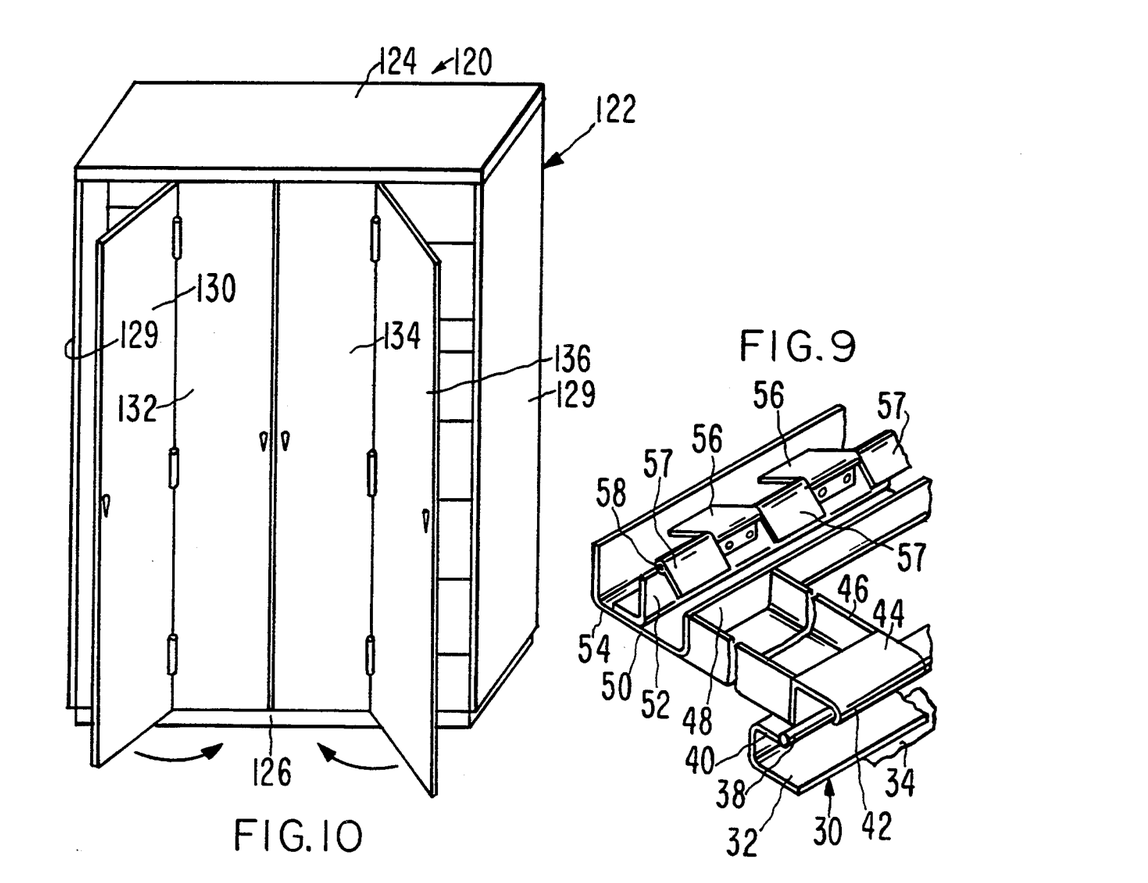
FIG. 9 is a fragmentary, perspective view, parts being broken away, of the hardware for hinging a pair of right-hand panels of the pickup truck of FIG. 1 to a base structure on the truck bed.
FIG. 10 is a perspective view of an electrical cabinet having four doors which are hinged about vertical hinge lines and can be opened and closed in the same manner as the panels of the pickup truck of FIG. 1.

Hinge support element 52 has a plurality of hinge leaves 56 thereon and the hinge leaves alternate with hinge leaves 57 and are pivotal relative to each other and to the hinge pin 58 (FIG. 9).

Panel 22 is provided with an inner side flange 60 (FIG. 8A) which is coupled to alternate hinge leaves 56 (FIG. 9) so that the panel 22 can move from the full line position of FIG. 8A through the dashed line position of FIG. 3 to a generally upright position (not shown). Thus, this allows opening of the space 63 (FIG. 4) normally covered by panel 22 so that access can be gained to the interior of the truck or vehicle bed with only panel 22 in an open position as shown in FIG. 3. A gas spring or spring bias means 65 in the form of a piston and cylinder assembly is pivotally mounted at one end 66 (FIG. 8A) to a subframe member 46 and at the opposite end to the panel 22. Gas spring 65 effectively supports and releasably holds the panel 22 in a generally upright position as shown in FIG. 3. In its closed position, panel 22 has an overlapping lip 67 (FIG. 8A) which directs water downwardly along a generally vertical path and onto the ground in event of rain falling on the top surface of panels 22, 24, 26 and 28 of assembly 10. Moreover, each of the C-shaped member 30 (FIG. 8A) channels water fore and aft to keep the system 10 water-tight, the ends of members 30 being open.

Panel 24 is pivotally mounted to the adjacent hinge pin 58 by being connected with the remaining hinge leaves 57 which are not connected to the flange 60 of panel 22. To this end, panel 24 has a flange 69 (FIG. 8A) which is connected to alternate hinge leaves 57 (FIG. 9); thus, while panel 22 is in a closed position as shown in FIG. 2, panel 24 can be opened to permit access to the space denoted by the numeral 63a (FIG. 4) which is normally covered by panel 24. Some means can be provided to stabilize and keep the panel 24 in a generally upright position. Also, panel 24 has an inner side lip 71 (FIGS. 8A and 8B) which extends between the front and rear ends of the bed of the truck and which is also received within a U-shaped trough-like element 72 on the adjacent inner side of panel 26 (FIG. 8B). Element 72 channels rain water to the front or back of the bed and onto the ground from the open ends of element 72.

Referring once again to panels 22 and 24, the entire portion of the space 63 and the space 63a which is normally covered by panels 22 and 24 can be opened by first swinging panel 24 about the axis of adjacent left-hand hinge pin 58 such that the panel 24 lies on panel 22 (FIG. 8); then, subframe 46 (FIG. 9) is lifted and pivoted about the axis of the adjacent left-hand hinge pin 38 (FIG. 8A) so that the panels 22 and 24 will essentially be in a vertical, side board position as shown in FIG. 6. Similarly, panels 26 and 28 are moved in the same manner into their side board position as shown in FIG. 6.

To support panels 22 and 24 while in their upright positions, a pair of tubular members 75 (FIG. 6) are secured in upright positions by fasteners 77 (FIG. 6) to the bed 79 of the vehicle. A pivot pin 78 interconnects a bar 80 with the upper end of each member 75 as shown in FIG. 6. The member 75 is cut away from the upper end thereof so that the upper end of shaft 80 can pivot into the generally horizontal position shown in FIG. 2 when the corresponding panel 22 is in its closed position as shown in FIG. 2. Shaft 80 is received telescopically within a tubular extension 82 (FIG. 6) which is pivotally mounted by a pin 84 to the underside of the adjacent U-shaped member 50 (FIG. 8A). Thus, each member 75, shaft 80 and extension 82 are coupled at the ends thereof to bed 79 and member 50, respectively so as to stabilize the panels 22 and 24 and to allow the panels 22 and 24 to be raised as a unit to its full sideboard position with the removable support bar 90 raised and inserted in sideboard supports 75.

FIG. 8B shows the same structure as FIG. 8A except that FIG. 8B shows a hinge structure for right-hand panels 26 and 28. Since the structures of FIGS. 8A and 8B are the same, the panels 26 and 28 can be moved from their closed positions as shown in FIG. 2 into their full sideboard positions shown in FIG. 6. Moreover, FIG. 6 shows the removable support bar 90 (FIG. 6) raised and inserted in the sideboard support 75 in the same manner as that described above with respect to the left-hand panels 22 and 24.

Figure 7:
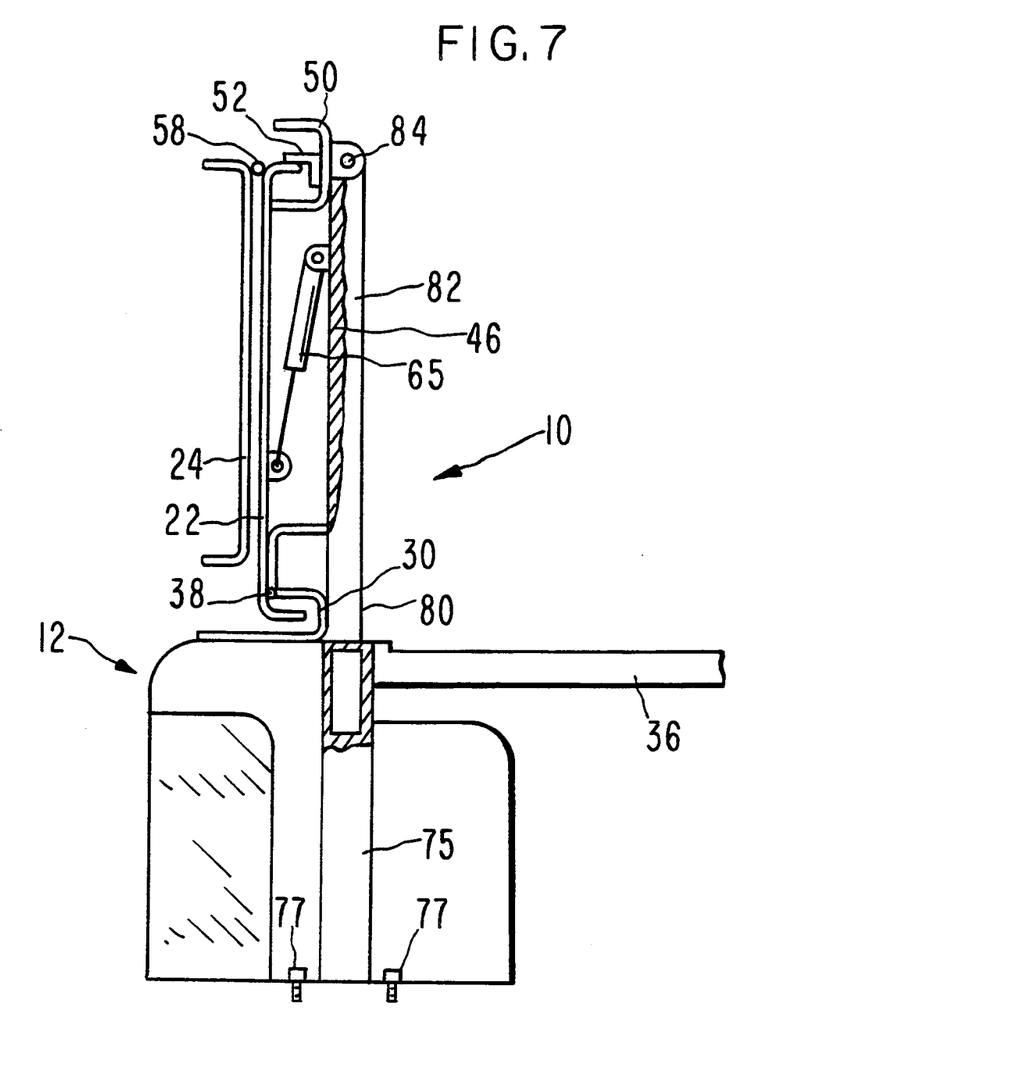
FIG. 7 is a view similar to FIG. 6 showing the way in which a cross bar of FIG. 6 is put into place.

A pair of cross bars 90 having end legs 92 (FIGS. 6 and 7) can be provided for the open upper ends of removable support bars 82 as shown in FIG. 6 and 7.

The closure 10 has a hasp 96 (FIG. 1) which interconnects panels 24 and 26. Before panel 24 can be shifted into an open position to open the corresponding space 63a, the hasp 96 must be released or unlocked.

In operation, the panels of assembly 10 typically are in closed positions shown in FIG. 2 in which each shaft 80 and its extension 82 are generally horizontal and extend laterally from the corresponding upright member 75 in underlying relationship to the corresponding member 46. Thus, there is a substantially maximum amount of space in the bed of the truck in underlying relationship to the panels to haul all kinds of goods.

When it is decided to open or gain access to one side space, such as space 63 (FIG. 4) of the bed, the corresponding panel, such as panel 22, typically is unlocked, if it is locked at all. Generally, the outer panels 22 and 28 will each have a three point latch of the type shown in FIG. 5 wherein a pair of rods 100 are coupled to a rotating member 102 having an axis of rotation 104 and a handle 106 which is accessible to the user at the side of the closure 10 as shown in FIG. 4. The outer ends of rods extend through holes 108 in subframe members 46 (FIG. 9) so that, to unlock the corresponding panel, such as panel 22, a lock on handle 106 is unlocked, following which the handle 106 is rotated to retract the ends of the rods 100 from holes 108 (FIG. 5). Then, the adjacent panel 22 or 28 can be pivoted into its upright position as shown in FIG. 3 to gain access to the corresponding space 63 or 63a of the bed of the truck.

FIG. 3 shows the open portions of the bed of the truck when panels 24 and 26 are in their open positions. FIG. 8 shows the front of the vehicle bed near the pickup cab, there being a gas spring 93 extending downwardly and inwardly between the extension 82 and a crosspiece 89, a feature which is not objectionable because there is no space available adjacent to the cab and rearwardly of the cab as in the case of the rear portion of the truck bed in which gas springs 65 are used.

With the addition of sliding side panels or brackets 150 (FIG. 6A) to panels 24 and 26, sideboard height can easily be increased by 50% for hauling or extra height for temporary canvas covered camper shell. It is possible to still maintain excellent strength due to rigid design of subframe and folding brackets.

Figures 11, 12:
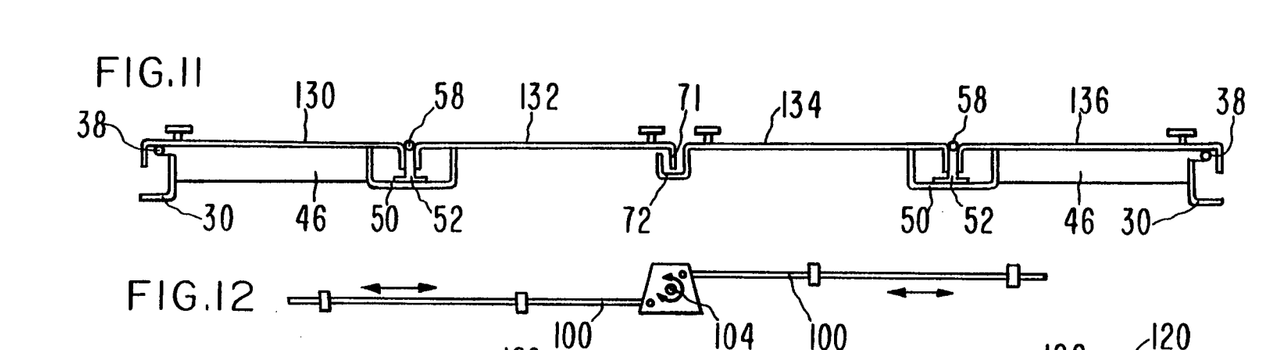
FIG. 11 is a cross-sectional view of the cabinet doors when the outer panels are in their closed position.
FIG. 12 is a schematic view of a three point latch system for releasably locking an end panel of the set of door panels of FIG. 10 on the cabinet.
Figure 13:
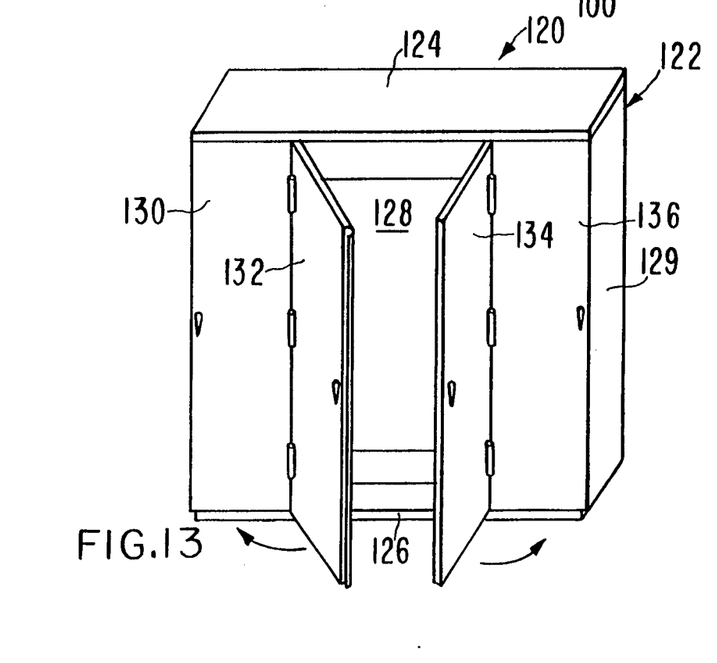
FIG. 13 is a view similar to FIG. 10 but showing the way in which the center pair of door panels of the cabinet can be opened while the outer doors remain closed.
Figure 14:
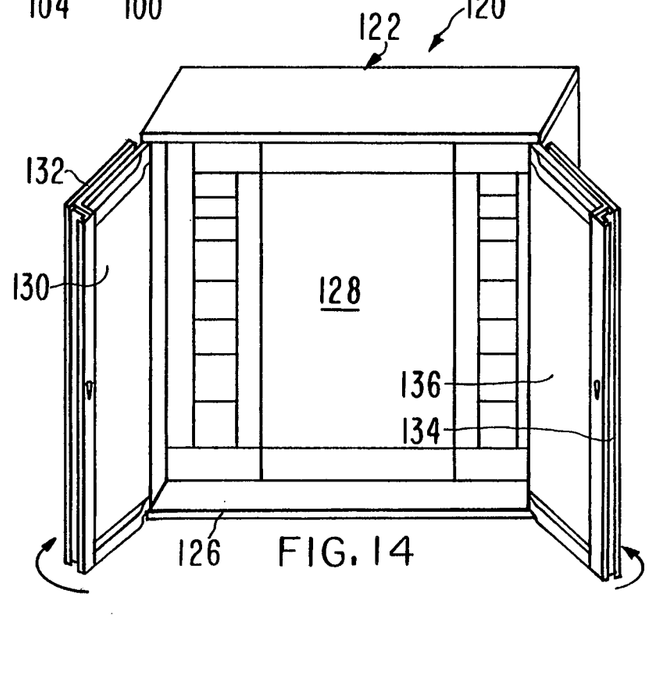
FIG. 14 is a view similar to FIGS. 10 and 13, but showing the way in which all four door panels of the cabinet can be opened to gain access to the interior of the cabinet.

The principles of the present application can be applicable to a fixed object in the form of a cabinet of metal or the like, such as an electrical cabinet for containing high voltage electrical equipment. Such a cabinet is shown in FIGS. 10, 13 and 14 in which the cabinet 120 includes a housing 122 having a top 124, a bottom 126, a rear wall 128, a pair of side walls 129 and four doors 130, 132, 134 and 136 as shown in FIGS. 10, 13 and 14. The doors are provided with pivot structure of the type shown and described with respect to FIG. 4, 8A, 8B and 9. To this end, the bottoms and the top portions of the doors will be provided with the structure shown in FIG. 11 including hinge pins 38, hinge pins 58, and optionally a gas spring 65. The doors will be free to open in the manner shown in FIGS. 10, 13 and 14. Either or both left-hand doors 130 and 132 can be opened to gain access to the respective space covered by these doors normally. FIG. 13 shows the inner doors 132 and 134 which can be opened as the outer doors 130 and 136 remain closed. FIG. 14 shows doors 130, 132, 134 and 136 in their full open or side board positions. In such a case, the entire opening of the housing 122 is accessible to a workman. FIG. 12 shows a three-point latching system similar to the system of FIG. 5.

In operation, the doors are opened or closed in the same manner as that mentioned above with respect to panels 22, 24, 26 and 28 except that doors 130, 132, 134 and 136 are pivotal on generally vertical hinge axes. However, the trough or gutter features of the present invention are still available for use with the doors of the cabinets shown in FIGS. 10, 13 and 14. Any rain striking the top or front panels faces of the cabinet when the doors are closed will be channeled downwardly to the ground or to a trough which channels water away from the cabinet.

The cover of the present invention can be used on a variety of enclosures. For example, the cover can be used with hydraulic control panels, storage cabinets, and any enclosure that has limited frontal access space or that would be desirable to access from left, right and center but still be able to open for 100% access.

Figure 6B:
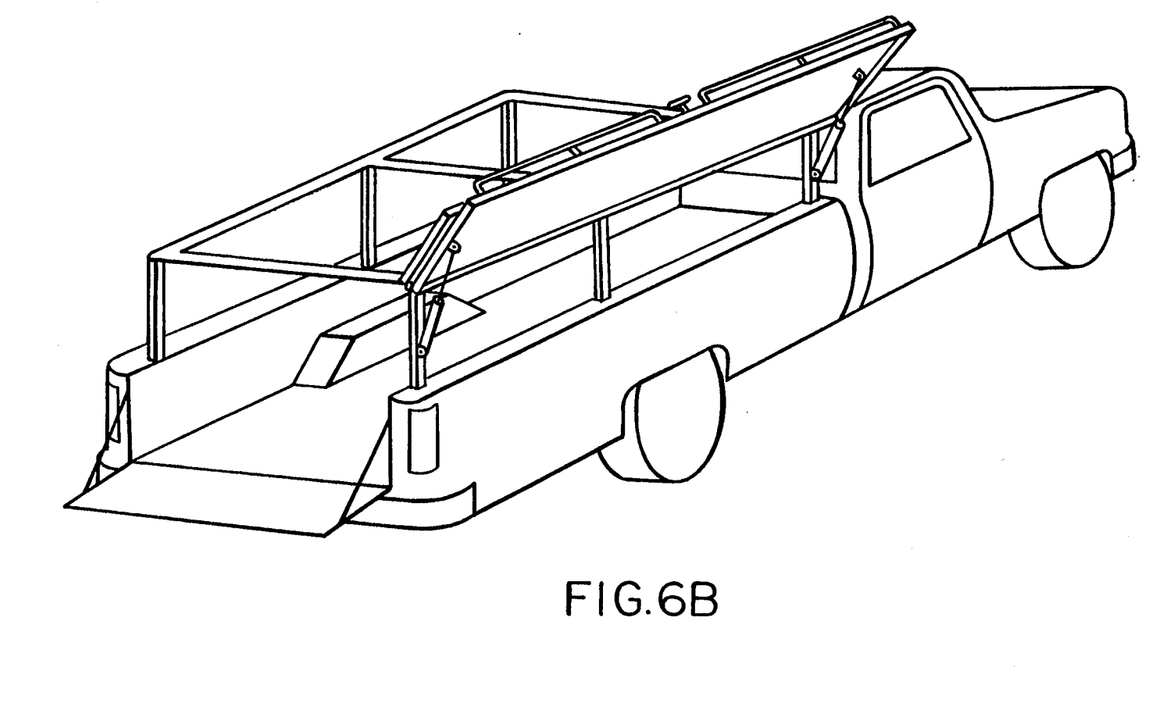
FIG. 6B is a perspective view of the truck showing the sideboard position to provide accessibility to the vehicle simply by opening the panels on either side of the vehicle.

The sideboard position accessibility is gained simply by opening covers on either side of the vehicle.

What is claimed is:

1. A closure assembly for a structure having an opening surrounded by a main frame having a pair of opposed ends and a pair of opposed sides comprising:
    a first pair of panels for one side of the frame and a second pair of panels for the opposite side of the frame, the panels having closed positions in which the panels are generally coplanar with each other, each panel being movable to an open position from the closed position thereof, there being a first junction between the first pair panels, a second junction between the second pair of panels, and a third junction between the first and second pairs of panels;
    first pivot means at the first junction for mounting each of the first pair of panels for pivotal movement about a first axis substantially parallel to the sides of the frame, whereby the portion of the opening of the structure covered by each of the first pair of panels can be opened;
    second pivot means at the junction of the second pair of panels for mounting each of the second pair of panels for pivotal movement about a second axis substantially parallel with the first axis, whereby the portion of the opening covered by each of the second pair of panels can be opened;
    third means coupled with the first pivot means for pivoting the first pair of panels as a unit into a respective side position generally coextensive with one side of the structure and generally transverse to a plane of the opening when one of the panels of the first pair has been pivoted into a position adjacent to the other panel of the first pair;
    fourth means coupled with the second pivot means for pivoting the second pair of panels as a unit into a respective side position generally coextensive with the other side of the structure and generally transverse to the plane of the opening when one of the panels of the second pair has been pivoted into a position adjacent to the other panel of the second pair; and
    brace means for supporting the first and second pairs of panels when the panels are in the respective side positions, said brace means having elongated, extensible structure extending transversely of the sides near one of said ends and inwardly of the opening when the panels are generally coplanar with each other, the first pivot means having a first channel member for channelling rain water to one end of a first panel, and a second channel member for channelling rain water to an end of one of a second panel.

2. An assembly as set forth in claim 1, wherein said first and second axes are generally horizontal.

3. An assembly as set forth in claim 1, wherein is included a spring bias means coupled to one of the first pair of panels to assist the movement of the one panel relative to the opening as the one panel pivots about the first pivot axis.

4. An assembly as set forth in claim 1, wherein said panels comprise four panels for covering the open top of the bed of a pickup truck.

5. An assembly as set forth in claim 1, wherein parts of certain of said panels a comprise third channel member for channeling rain water away from the panels.

6. An assembly as set forth in claim 5, wherein said channel members have horizontal channels, said channels being open at the ends thereof.

7. An assembly as set forth in claim 5, wherein said channel members have generally horizontal channels having open ends, said channels being at the first, second and third junctions.

8. A closure assembly for the bed of a truck having a top opening in a plane, a pair of opposed ends, and a pair of opposed sides comprising:
    first and second panels for one side of the frame, and third and fourth panels for the opposite side of the frame, the panels having closed positions in which the panels are generally coplanar with each other, each panel being movable to an open position from the closed position thereof, there being a first junction between the first and second panels, a second junction between the third and fourth panels, and a third junction between the second and third panels;
    first pivot means at the first junction for mounting each of the first and second panels for pivotal movement about a first horizontal axis substantially parallel to the sides of the truck, whereby the portion of the opening of the structure covered by each of the first and second panels can be opened;
    second pivot means at the second junction for mounting each of the third and fourth panels for pivotal movement about a second horizontal axis substantially parallel with the first axis, whereby the portion of the opening covered by each of the third and fourth panels can be opened;
    third means coupled with the first pivot means, respectively, for pivoting the first and second panels as a unit into a side position generally coextensive with one side of the truck and generally transverse to the plane of the opening when one of the first and second panels has been pivoted into a position adjacent to the other panel;
    fourth means coupled with the second pivot means for pivoting the third and fourth panels as a unit into a position generally coextensive with the other side of the truck and generally transverse to the plane of the opening when one of the third and fourth panels has been pivoted into a position adjacent to the other panel; and
    brace means for supporting the panels when the panels are in the respective side positions, said brace means having elongated, extensible structure extending transversely of the sides near one of said ends and inwardly of the opening when the panels are in their closed positions, the first pivot means having a first horizontal, open-top channel member for channelling rain water to one end of the first panel, and a second open top channel member for channelling rain water to an end of one of the third and fourth panels.

9. An assembly as set forth in claim 8, wherein said first and second axes are generally in the plane of the top opening of the truck bed.

10. An assembly as set forth in claim 8, wherein said first and second axes are spaced inwardly from the sides of the truck.

11. An assembly as set forth in claim 8, wherein is included a spring bias means coupling the first pivot means with one of the first and second panels to assist the movement of the one panel relative to the opening as the one panel pivots about the first pivot axis.

12. An assembly as set forth in claim 1, wherein said first pivot means includes a U-shaped channel member having a central web and a pair of spaced sides, said first pivot axis being spaced from the web, and a hinge pin pivotally coupling the first and second panels on the member for movement independently of each other, said coupling means including a number of hinge leaves pivotally mounted on the hinge pin, each of said pair of first panels having a flange connected to alternate hinge leaves.

13. An assembly as set forth in claim 1, wherein said first pivot means includes a U-shaped channel member having a central web and a pair of spaced sides, said first pivot axis being spaced from the web, and a hinge pin pivotally coupling the first and second panels on the member for movement independently of each other, said third means includes an elongated subframe coupled at one end to one side of the U-shaped member, said subframe extending toward the outer side margin of the pair of first panels, and hinge pin means for hingedly mounting the opposite end of the subframe on said truck.

14. An assembly as set forth in claim 13, wherein said hinge pin means for mounting the subframe includes a transversely C-shaped element having a pair of sides, and a pivot pin secured to one of the sides of the element, the opposite side of the element being secured to the truck, whereby the subframe and the first and second panels can pivot as a unit from a position generally parallel with the plane of the opening to a position generally perpendicular to the plane of the opening.

15. An assembly as set forth in claim 8, wherein each of the first and fourth panels has a latch unit carried thereby.

16. An assembly as set forth in claim 8, wherein is included a crosspiece removably coupled to the brace means for supporting the panels when the panels are in their side positions.

17. An assembly as set forth in claim 8, wherein parts of certain of said panels comprise a third channel member for channeling rain water away from the panels.

18. An assembly as set forth in claim 17, wherein said channel members have horizontal channels, said channels being open at the ends thereof.

19. An assembly as set forth in claim 8, wherein said channel members have generally horizontal channels having open ends, said channels being at the first, second and third junctions.

20. A closure assembly for a structure having an opening surrounded by a main frame having a pair of opposed ends and a pair of opposed sides comprising:

a first pair of panels for one side of the frame and a second pair of panels for the opposite side of the frame, the panels having closed positions in which the panels are generally coplanar with each other, each panel being movable to an open position from the closed position thereof, there being a first junction between the first pair of panels, a second junction between the second pair of panels, and a third junction between the first and second pairs of panels;

first pivot means at the first junction for mounting each of the first pair of panels for pivotal movement about a first axis substantially parallel to the sides of the frame, whereby the portion of the opening of the structure covered by each of the first pair of panels can be opened;

second pivot means at the junction of the second pair of panels for mounting each of the second pair of panels for pivotal movement about a second axis substantially parallel with the first axis, whereby the portion of the opening covered by each of the second pair of panels can be opened;

third means coupled with the first pivot means for pivoting the first pair of panels as a unit into a respective side position generally coextensive with one side of the structure and generally transverse to a plane of the opening when one of the panels of the first pair has been pivoted into a position adjacent to the other panel of the first pair;

fourth means coupled with the second pivot means for pivoting the second pair of panels as a unit into a respective side position generally coextensive with the other side of the structure and generally transverse to the plane of the opening when one of the panels of the second pair has been pivoted into a position adjacent to the other panel of the second pair; and brace means for supporting the first and second pairs of panels when the panels are in the respective side positions, said brace means having elongated, extensible structure extending transversely of the sides near one of said ends and inwardly of the opening when the panels are in the closed positions thereof generally coplanar with each other, said first pivot means including a U-shaped channel member having a central web and a pair of spaced sides, said first pivot axis being spaced from the web, and a hinge pin pivotally coupling the first pair of panels on the member for movement independently of each other.

21. An assembly as set forth in claim 20, wherein said coupling means includes a number of hinge leaves pivotally mounted on the hinge pin, each of said pair of first panels having a flange connected to alternate hinge leaves.

22. An assembly as set forth in claim 21, wherein said third means includes an elongated subframe coupled at one end to one side of the U-shaped member, said subframe extending toward the outer side margin of the pair of first panels, and hinge pin means for mounting the opposite end of the subframe on said main frame.

23. An assembly as set forth in claim 22, wherein said hinge pin means for mounting the subframe includes a transversely C-shaped element having a pair of sides, and a pivot pin secured to one of the sides of the element, the opposite side of the element being secured to the main frame, whereby the subframe and the pair of first panels can pivot as a unit from a position generally parallel with the opening to a position generally perpendicular to the opening.

* * * * *